US006604271B2

(12) United States Patent
Ishigaki et al.

(10) Patent No.: US 6,604,271 B2
(45) Date of Patent: Aug. 12, 2003

(54) PROCESS FOR PROCESSING A CONDUCTIVE DAMPER FOR USE IN SPEAKER

(75) Inventors: Toshihiro Ishigaki, Yamagata (JP); Takeshi Tokusho, Yamagata (JP)

(73) Assignees: Pioneer Corporation, Tokyo (JP); Tohoku Pioneer Corporation, Yamagata (JP)

( * ) Notice: Subject to any disclaimer, the term of this patent is extended or adjusted under 35 U.S.C. 154(b) by 252 days.

(21) Appl. No.: 09/749,676

(22) Filed: Dec. 28, 2000

(65) Prior Publication Data

US 2001/0006725 A1 Jul. 5, 2001

(30) Foreign Application Priority Data

Dec. 28, 1999 (JP) .......................................... 11-374822

(51) Int. Cl.[7] .................................................. H01S 4/00

(52) U.S. Cl. ....................... 29/592.1; 29/594; 29/609.1; 29/861; 29/883; 29/884; 425/398; 425/412; 425/470

(58) Field of Search ................................ 29/592.1, 594, 29/609.1, 861, 883, 884; 425/398, 412, 470

(56) References Cited

U.S. PATENT DOCUMENTS

| | | | | | |
|---|---|---|---|---|---|
| 4,362,787 | A | * | 12/1982 | Jezbera | 428/572 |
| 5,066,351 | A | * | 11/1991 | Knoll | 156/212 |
| 5,125,473 | A | * | 6/1992 | Sakamoto et al. | 181/116 |
| 5,283,027 | A | * | 2/1994 | Sakamoto et al. | 264/320 |
| 6,208,020 | B1 | * | 3/2001 | Minamio et al. | 257/684 |
| 6,332,262 | B1 | * | 12/2001 | Sakamoto | 29/594 |

* cited by examiner

*Primary Examiner*—A. Dexter Tugbang
*Assistant Examiner*—Paul Kim
(74) *Attorney, Agent, or Firm*—Sughrue Mion, PLLC

(57) ABSTRACT

A conductive damper for use in a speaker is provided, the endurance and the moldability of which are improved. A base is moved downward to allow an inner top mold to abut on a bottom mold, then the base is further moved downward to allow the inner top mold and the bottom mold to be applied pressure and the base moves down with being guided by guiding means. At this time, energizing means energizes the inner top mold to press the bottom mold, thereby corrugations for the inner part of a workpiece of the conductive damper are molded. At this time, the workpiece of the conductive damper is pulled toward the inner side thereof. Then, the base is further moved downward to press an outer top mold onto the bottom mold, thereby corrugations for the outer part of the workpiece of the conductive damper are molded.

6 Claims, 1 Drawing Sheet

PROCESS FOR PROCESSING A CONDUCTIVE DAMPER FOR USE IN SPEAKER

BACKGROUND OF THE INVENTION (1) Field of the Invention

This invention relates to a process and apparatus for producing a conductive damper for use in a speaker, in which knitted tinsel wires are integrated with the damper.

(2) Description of the Related Art

So far, a conductive damper for use in a speaker, which is formed by integrating knitted tinsel wires with the damper by means of sewing, glueing, knitting and so on, has been molded by putting the workpiece between an upper and lower molds followed by pressing under heating, similarly to an ordinary damper.

Consequently, depending upon the dimensions and configuration of a corrugation to be molded, there have been problems such that an excessive force is applied to the workpiece (a piece of cloth material) upon press molding, a non-uniform force is applied to the workpiece, threads in the workpiece are extended on an undesirable condition, and in an extreme instance the workpiece is torn up beyond its limits.

As to the conventional conductive damper for use in a speaker, in which knitted tinsel wires are integrated with the damper, since the knitted tinsel wires are sandwiched at a stretch by molds having the configuration of the corrugation, the knitted tinsel wires are damaged by a tension produced upon press molding, causing a deterioration in endurance against oscillation of a speaker. When the configuration of the corrugation is deep, the knitted tinsel wires are cut, making the press molding impossible.

SUMMARY OF THE INVENTION

It is therefore an objective of the present invention to solve the above problem and provide a process and apparatus for producing a conductive damper for use in a speaker, in which a double mold for press molding is employed in order to minimize the damage of the knitted tinsel wires by a tension produced upon press molding, that is, the corrugation of the damper is formed by using the two molds, an inner part of the corrugation is press-molded first, then an outer part of the corrugation is press-molded after a very short period of time so as to improve the endurance of the damper, and the press molding of the corrugation having a deep configuration is enabled to meet with the demand of producing a speaker having large oscillation amplitude.

In order to attain the above objective, the present invention is to provide a process for producing a conductive damper for use in a speaker, in the process a workpiece of the conductive damper, in which knitted tinsel wires are integrated with a sheet-shaped workpiece, is set between top and bottom molds, on the surface of each of which a plurality of corrugations are formed concentrically, then the workpiece of the conductive damper is pressed by the top and bottom molds so as to be molded in a damper-shape, the process comprising: a first step, in which the workpiece of the conductive damper is set on the bottom mold; a second step, in which the top mold is moved in the direction nearer to the bottom mold so as to mold one corrugation or a plurality of corrugations for the inner part of the workpiece of the conductive damper; and a third step, in which the top mold is further moved in the direction nearer to the bottom mold so as to mold one corrugation or a plurality of corrugations for the outer part of the workpiece of the conductive damper, wherein the third step is repeatedly performed so that the workpiece of the conductive damper is molded in a damper-shape.

The third step is performed once and the second step is performed twice.

By pressing the workpiece of the conductive damper at least in two steps separately, the large amount of cloth and knitted tinsel wires can be pulled into the mold compared to a conventional pressing. Thereby, the tensional damage applied to the knitted tinsel wires is reduced and the endurance of the conductive damper improves. Moreover, the press molding of the corrugation having a deep configuration is achieved to meet with the demand of producing a speaker having large oscillation amplitude.

The present invention is also to provide an apparatus for producing a conductive damper for use in a speaker, including top and bottom molds, on the surface of each of which a plurality of corrugations are formed concentrically, by using the apparatus a workpiece of the conductive damper, in which knitted tinsel wires are integrated with a sheet-shaped workpiece, is set on the bottom mold, then the workpiece of the conductive damper is pressed by moving the top mold so as to be molded in a damper-shape, the apparatus comprising: a bottom mold, on the surface of which a plurality of corrugations are formed concentrically; at least two divided top molds including a first top mold and a second top mold, which are formed by concentrically dividing the top mold into the inner part and the outer part and provided with a plurality of corrugations at positions corresponding to the corrugations of the bottom mold; and a moving mechanism moving up and down independent of the first and second top molds, including: a base, to which the second top mold is mounted; guiding means provided to the base for controlling a movement of the first top mold in the up-and-down direction; and energizing means provided to the base for energizing the first top mold to press the second top mold, wherein by moving the base downward, the inner part of the workpiece of the conductive damper is press-molded between the first top mold and the bottom mold, then the outer part of the workpiece of the conductive damper is press-molded between the second top mold and the bottom mold.

The first top mold is divided concentrically into a plurality of divided molds, each of which has the guiding means and the energizing means.

According to the construction described above, the base is moved downward to allow an inner top mold (i.e. the first top mold) to abut on the bottom mold, then the base is further moved downward to allow the inner top mold and the bottom mold to be applied pressure and the base moves down being guided by the guiding means. At this time, the energizing means energizes the inner top mold to press the bottom mold, thereby corrugations for the inner part of the workpiece of the conductive damper are molded. At this time, the workpiece of the conductive damper is pulled toward the inner side thereof. Then, the base is further moved downward to press an outer top mold (i.e. the second top mold) onto the bottom mold, thereby corrugations for the outer part of the workpiece of the conductive damper are molded.

By pressing the workpiece of the conductive damper at least in two steps separately as described above, the large amount of cloth and knitted tinsel wires can be pulled into the mold. Thereby, the tensional damage applied to the knitted tinsel wires is reduced, and the endurance and the moldability of the conductive damper improve. Moreover, the press molding of the corrugation having a deep configuration is achieved to meet with the demand of producing a speaker having large oscillation amplitude.

DESCRIPTION OF THE PREFERRED EMBODIMENTS

In the following, the preferred embodiment of the present invention will be explained with reference to the attached drawings.

Figure 1A:
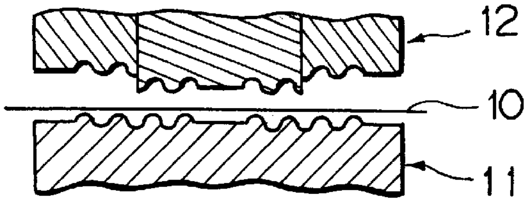
FIGS. 1A, 1B and 1C illustrate a process for producing a conductive damper for use in a speaker according to the present invention.
Figure 1B:
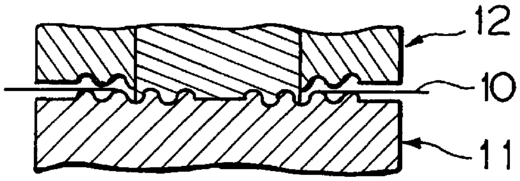
Figure 1C:
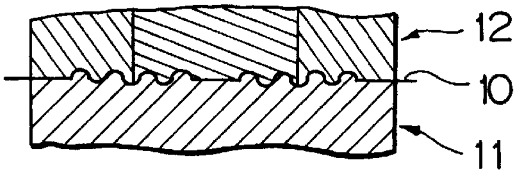

FIGS. 1A, 1B and 1C illustrate a process for producing a conductive damper for use in a speaker according to the present invention, which show a position of each mold before the press-molding (FIG. 1A), after the inner part of the workpiece is press-molded (FIG. 1B), and after the outer part of the workpiece is also press-molded to complete the formation of the damper (FIG. 1C).

Molds for molding the damper through two steps are made in order to minimize the damage of knitted tinsel wires due to tension generated during the pressing. A bottom mold 11 is provided with corrugations of the damper concentrically, while a top mold 12 is provided with corrugations at positions corresponding to the corrugations of the bottom mold 11. The corrugations of the top mold 12 are divided into two parts, i.e. an inner and an outer part, and the two-step molding is carried out using the boundary between the inner and outer parts as a division boundary of the top mold 12.

First of all, a workpiece 10 of the damper, in which knitted tinsel wires are integrated with a sheet-shaped workpiece, is set on the bottom mold 11. Then, the top mold 12 is moved down toward the bottom mold 11 to start pressing. An inner part of the workpiece 10 is press-molded in accordance with the inner part of the corrugations of the top mold 12. Then, after a very short period of time, the top mold 12 is further moved down toward the bottom mold 11 in order to press-mold an outer part of the workpiece 10 in accordance with the outer part of the corrugations of the top mold 12.

By pressing the workpiece of the conductive damper in two steps separately as described above, a larger amount of cloth and knitted tinsel wires can be pulled into the mold compared to a one-step pressing. Thereby, the tensional damage applied to the knitted tinsel wires is reduced and the endurance of the conductive damper improves. A condition of the pressing is, for example, at a temperature of the molds at 265° C., a load for pressing of 2 kg and a period of time for pressing of 7 seconds.

Figure 2:
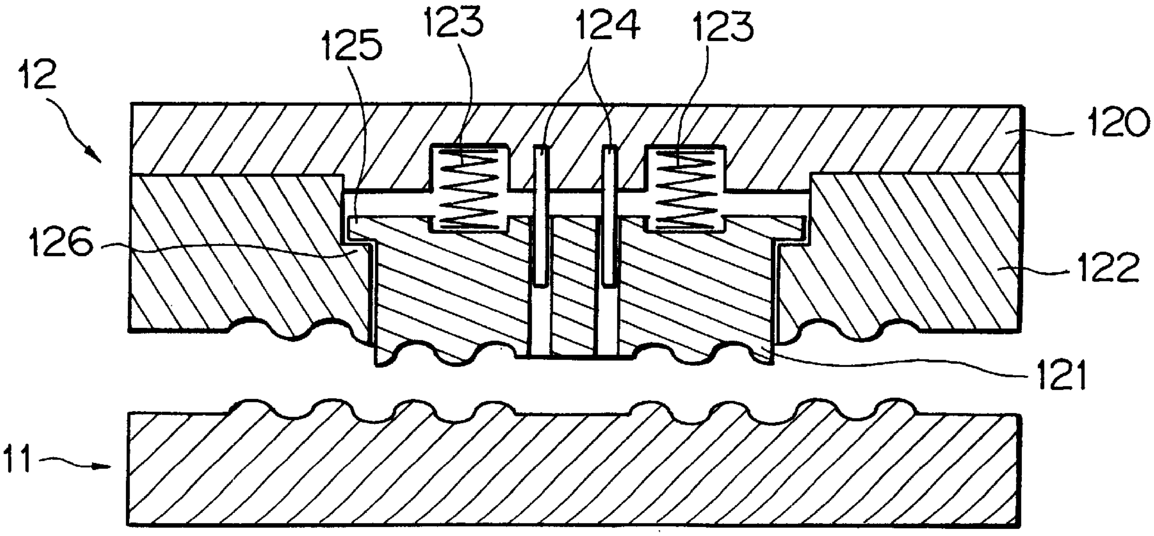
FIG. 2 illustrates a primary structure of an apparatus for producing a conductive damper for use in a speaker according to the present invention.

FIG. 2 illustrates a primary structure of an apparatus for producing a conductive damper for use in a speaker according to the present invention, in which the same abbreviation numerals are used for the same member shown in FIG. 1.

Each of bottom mold 11 and top mold 12 is provided with a plurality of corrugations concentrically. The workpiece 10 is set on the bottom mold 11, then the top mold 12 is moved to press the workpiece 10 so as to mold the workpiece 10. The top mold 12 is provided with a plurality of corrugations at positions corresponding to the corrugations of the bottom mold 11 and divided concentrically into two divided molds, i.e. a first top mold (i.e. inner top mold 121) and a second top mold (i.e. outer top mold 122), each of which is for press-molding the inner part of the workpiece and for press-molding the outer part of the workpiece, respectively.

Brocaded thread lines are sewn into a cloth, into which synthetic resin is impregnated, then glued and knitted to make a workpiece 10 of a conductive damper, which is set on the bottom mold 11.

The outer top mold 122 is fixed to a base 120. An up-and-down movement of the inner top mold 121 is controlled by a guide pin 124 provided to the base 120. When the inner top mold 121 abuts on the bottom mold 11 by a spring 123, the inner top mold 121 is energized to press the bottom mold 11. The inner top mold 121 is provided with a flange 125, which is supported by a step 126 formed in the outer top mold 122.

When the base 120 moves downward, the inner top mold 121 abuts on the bottom mold 11, and when the base 120 moves further downward, the inner top mold 121 and the bottom mold 11 are applied pressure, then the base 120 moves downward being guided by the guide pin 124. At this time, the spring 123 energizes the inner top mold 121 to press the bottom mold 11, thereby corrugations for the inner part of the workpiece 10 of the conductive damper are molded. At this time, the workpiece 10 is pulled toward the inner side thereof. Then, the base 120 is further moved downward to press the outer top mold 122 onto the bottom mold 11, thereby corrugations for the outer part of the workpiece 10 of the conductive damper are molded.

Thus, since the workpiece 10 of the conductive damper is press-molded in two steps separately as described above, the area of the workpiece 10, which is fixed in order to be press-molded in each step, is reduced, thereby the large amount of material (i.e. cloth and knitted tinsel wires) can be pulled into the mold compared to a conventional one-step press-molding. Therefore, the tensional damage applied to the knitted tinsel wires is reduced. Thus, the sheet-shaped workpiece 10 containing the knitted tinsel wires, which is pulled into the mold, is pressed to be transformed into a shape having corrugations therein and kept its shape by phenol resin.

The aforementioned preferred embodiment is described to aid in understanding the present invention and variations may be made by one skilled in the art without departing from the spirit and scope of the present invention.

According to the present invention, since a workpiece of the conductive damper, in which knitted tinsel wires are integrated with cloth, is pressed at least in two steps separately by using divided upper molds as described above, larger amounts of the cloth and knitted tinsel wires can be pulled into the molds compared to a conventional pressing. Therefore, the tensional damage applied to the knitted tinsel wires is reduced, and the endurance and the moldability of the conductive damper improve. Moreover, the press molding of the corrugation having a deep configuration is achieved to meet the demand of producing a speaker having large oscillation amplitude.

What is claimed is:

1. A process for producing a conductive damper for use in a speaker, in the process a workpiece of the conductive damper in which knitted tinsel wires are integrated with a sheet-shaped workpiece is set between top and bottom molds, on a surface of each of which molds a plurality of corrugations are formed concentrically, then the workpiece of the conductive damper is pressed by the top and bottom molds so as to be molded in a damper-shape, the process comprising:

a first step for setting the workpiece of the conductive damper on the bottom mold;

a second step for moving the top mold in a direction toward the bottom mold so as to mold one corrugation or a plurality of corrugations at an inner part of the workpiece of the conductive damper; and a third step for further moving the top mold in the direction toward the bottom mold so as to mold one corrugation or a plurality of corrugations at an outer part of the workpiece of the conductive damper, wherein the third step is repeatedly performed so that the workpiece of the conductive damper is molded in the damper-shape.

2. The process of producing a conductive damper for use in a speaker according to claim 1, wherein the second step is performed more times than the third step.

3. A method of producing a speaker conductive damper, in which conductive damper wires are integrated with a sheet-shaped workpiece, the process comprising:

(a) setting a workpiece of a conductive damper on the bottom mold;

(b) moving a top mold toward the bottom mold so as to mold at least one corrugation at an inner portion of the workpiece of the conductive damper;

(c) further moving the top mold toward the bottom mold so as to mold at least one corrugation at an outer portion of the workpiece of the conductive damper; and (d) repeating at least one of operation (b) and said operation (c) so that the workpiece of the conductive damper is molded in a damper-shape.

4. The method of claim 3, wherein said operation (c) is performed once and said operation (b) is performed twice.

5. The method of claim 3, wherein said operation (b) is performed more times than said operation (c).

6. The method of claim 3, wherein said operation (c) is repeated.

* * * * *